(12) United States Patent
Hirata et al.

(10) Patent No.: US 7,776,802 B2
(45) Date of Patent: Aug. 17, 2010

(54) HYDRODYNAMIC BEARING DEVICE, AND SPINDLE MOTOR AND INFORMATION DEVICE USING THE SAME

(75) Inventors: Katsushi Hirata, Ozu (JP); Hideaki Ohno, Sennan (JP); Takanori Shiraishi, Ozu (JP)

(73) Assignee: Panasonic Corporation, Osaka (JP)

( * ) Notice: Subject to any disclaimer, the term of this patent is extended or adjusted under 35 U.S.C. 154(b) by 547 days.

(21) Appl. No.: 11/294,525

(22) Filed: Dec. 6, 2005

(65) Prior Publication Data
US 2006/0120642 A1 Jun. 8, 2006

(30) Foreign Application Priority Data
Dec. 7, 2004 (JP) ............................. 2004-354625

(51) Int. Cl.
*C10M 105/38* (2006.01)
(52) U.S. Cl. .................... 508/485; 508/445; 384/13; 384/107
(58) Field of Classification Search ................. 508/445, 508/455, 462, 485, 495, 496, 505, 517, 532, 508/579; 384/100, 107
See application file for complete search history.

(56) References Cited

U.S. PATENT DOCUMENTS

| | | | | | |
|---|---|---|---|---|---|
| 3,681,247 | A | * | 8/1972 | Wann | ......................... 508/495 |
| 4,891,161 | A | * | 1/1990 | Tanikawa et al. | ............ 508/501 |
| 5,647,672 | A | * | 7/1997 | Fukutani | ..................... 384/100 |
| 5,940,246 | A | | 8/1999 | Khan et al. | |
| 2002/0173431 | A1 | * | 11/2002 | Hirata | ........................ 508/107 |
| 2003/0153472 | A1 | | 8/2003 | Nagano et al. | |

FOREIGN PATENT DOCUMENTS

| | | |
|---|---|---|
| CN | 86 1 01976 | 8/1986 |
| JP | 2001-208069 | 8/2001 |
| JP | 2001-316687 | 11/2001 |
| JP | 2002-206094 | 7/2002 |
| JP | 2003-171685 | 6/2003 |
| WO | 97/18562 | 5/1997 |

OTHER PUBLICATIONS

Chinese Office Action including English language translation issued Dec. 12, 2008 in connection with Chinese Application No. 2005/10129538 corresponding to the present application.

\* cited by examiner

*Primary Examiner*—Glenn A Caldarola
*Assistant Examiner*—Taiwo Oladapo
(74) *Attorney, Agent, or Firm*—Wenderoth, Lind & Ponack, L.L.P.

(57) ABSTRACT

The invention provides a hydrodynamic bearing device including at least one of a shaft structure and a sleeve having a dynamic pressure-generating mechanism, and a lubricant present in a gap between the shaft structure and the sleeve. The lubricant contains a diester with a total carbon number of 20-28 obtainable by a divalent alcohol that has at least one ether bond, and one or more types of C6 to C10 saturated monovalent fatty acid.

9 Claims, 2 Drawing Sheets

HYDRODYNAMIC BEARING DEVICE, AND SPINDLE MOTOR AND INFORMATION DEVICE USING THE SAME

RELATED APPLICATION

This application is a continuation of Japanese Patent Application No. 2004-354625, filed Dec. 7, 2004, which is incorporated by reference in its entirety.

BACKGROUND OF THE INVENTION

1. Field of the Invention

The present invention relates to a dynamic pressure-type hydrodynamic bearing device, as well as a spindle motor and information device using the same.

2. Description of the Prior Art

A hydrodynamic bearing device comprises a shaft and a sleeve that supports the shaft, and a lubricant that is interposed in the gap between the two parts. With rotation of the shaft, the lubricant is gathered up by dynamic pressure-generating grooves that are formed on the shaft or sleeve, and generates pressure such that the shaft is supported within the sleeve without coming into contact therewith. As a result, when high-speed rotation is attained, ambient noise during the rotation can be alleviated.

A spindle motor equipped with such a hydrodynamic bearing device can provide the requisite rotational accuracy with an increased recording density of the medium, and can furthermore provide excellent shock resistance and quietness. Thus, it can be used in a majority of motors for application in such representative magnetic disk devices as information technology equipment and audio-visual equipment.

However, in the particular case of a spindle motor equipped with this type of hydrodynamic bearing device used in magnetic disk devices, an electrostatic charge is generated by the flow of the lubricant that is interposed between the shaft and the sleeve and the air friction of the magnetic disk due to the high-speed rotation without contact between the sleeve and the shaft of the hydrodynamic bearing device, and this electric charge will be accumulated within the device. This accumulated electric charge can be discharged between the magnetic disk connected either to the shaft or the sleeve and the record/replay head, raising a concern about record/replay failures or damage to the record/replay head.

Countermeasures against this that have been proposed include magnetic disks where organic polymers as conductivity-enhancing additives are added to the lubricant (for example, see PCT 2000-500898 Official Bulletin citation), hydrodynamic bearing spindle motors where antistatic additives are added to the lubricant (for example, see Japanese published unexamined application No. 2001-208069), hydrodynamic bearing devices having lubricants that are formulated with specific additives (for example, see Japanese published unexamined application No. 2003-171685), and the like. In this type of technology, various additives are added to the lubricant in order to increase the conductivity or antistatic effect so that either a ground is provided for the electric charge within the device or the electrostatic charge is suppressed.

However, the viscosity of the lubricant will rise after adding more than a certain amount of a high molecular weight or a high viscosity compound as an additive, which leads to the problem of increased torque in the bearing device (in other words, increasing the power consumption).

Moreover, with the objective of increasing the specific effects of the additive (conductivity from a conductivity-enhancing additive, or prevention of static charge from an antistatic additive), the heat resistance and durability of the additive itself can exert an influence on the other functions of the lubricant. Furthermore, as the additive undergoes degradation, the reduced effectiveness of the additive can cause a progressive degradation of the entire lubricant, leading to the problem that long-term reliability cannot be achieved for the device.

In addition, in recent years, the demand has grown for magnetic disk devices that are increasingly miniaturized, more energy-conserving and progressed with operational lifetime, for decreased power consumption of motor and improvement of endurance for the spindle motor that is the main component.

For this reason, esters such as dioctyl sebacate (DOS), dioctyl azelate (DOZ), and dioctyl adipate (DOA) have been proposed for use as lubricants in hydrodynamic bearing devices. Moreover, esters obtained from neopentyl glycol and C6 to C12 monovalent fatty acids and/or their derivatives for use as lubricants in hydrodynamic bearing devices (see for example Japanese published unexamined application No. 2001-316687), the use of esters represented by the generic formula $R^1$—COO-$(AO)_n$—$R^2$ as lubricants for bearings (see for example Japanese published unexamined application No. 2002-206094) have been proposed. The use of low viscosity lubricants can also result in reduced torque (in other words, low power consumption).

However, while it is possible to reduce the torque in such conventional hydrodynamic bearing devices, since the heat resistance of the lubricant is low (vapor pressure is high), the amount of evaporation will be significant when used over a long period, and it will not be possible to maintain the quantity of lubricant required for stabilized rotation of the bearing device. Consequently, there will be problems with the device having inadequate reliability and the operational lifetime will be shorter. As a countermeasure to the amount of evaporation, one can consider a method by which the above requirement is addressed by adding an excess of the lubricant. However, this approach will entail problems in that this additional amount can increase the torque and bring a higher cost, and accommodating the additional space will make miniaturization more difficult.

SUMMARY OF THE INVENTION

The present invention provides a hydrodynamic bearing device, comprising at least one of a shaft structure and a sleeve having a dynamic pressure-generating mechanism, and a lubricant present in a gap between the shaft structure and the sleeve. The lubricant contains a diester with a total carbon number of 20-28 obtainable by a divalent alcohol that has at least one ether bond and one or more types of C6 to C10 saturated monovalent fatty acid.

Furthermore, the present invention provides a spindle motor equipped with the hydrodynamic bearing device and an information device equipped with the spindle motor.

The present invention makes it possible for the lubricant to exhibit favorable conductivity without the addition of additives that promote conductivity and/or that have an antistatic effect, so that a hydrodynamic bearing device with high reliability can be achieved. In addition, the hydrodynamic bearing device can be designed to exhibit reduced torque while avoiding any increased viscosity of the lubricant that is due to such additives. Furthermore, since the viscosity of the lubricant is reduced and the heat resistance is high, both a reduction in the torque of the hydrodynamic bearing device and a reduction in the loss of lubricant due to evaporation can be achieved relative to conventional systems. With these results, a hydrodynamic bearing device with low power consumption and a long operational lifetime can be achieved. Moreover, the amount of lubricant used to fill each hydrodynamic bearing device unit can be reduced, so that cost will be reduced and it will be possible to miniaturize the device.

BRIEF DESCRIPTION OF THE DRAWINGS

Referring now to the attached drawings which form a part of this original disclosure.

DETAILED DESCRIPTION OF THE INVENTION

Embodiments of the present invention are shown in detail below, and are described with reference to the drawings.

Embodiment 1

Figure 2:
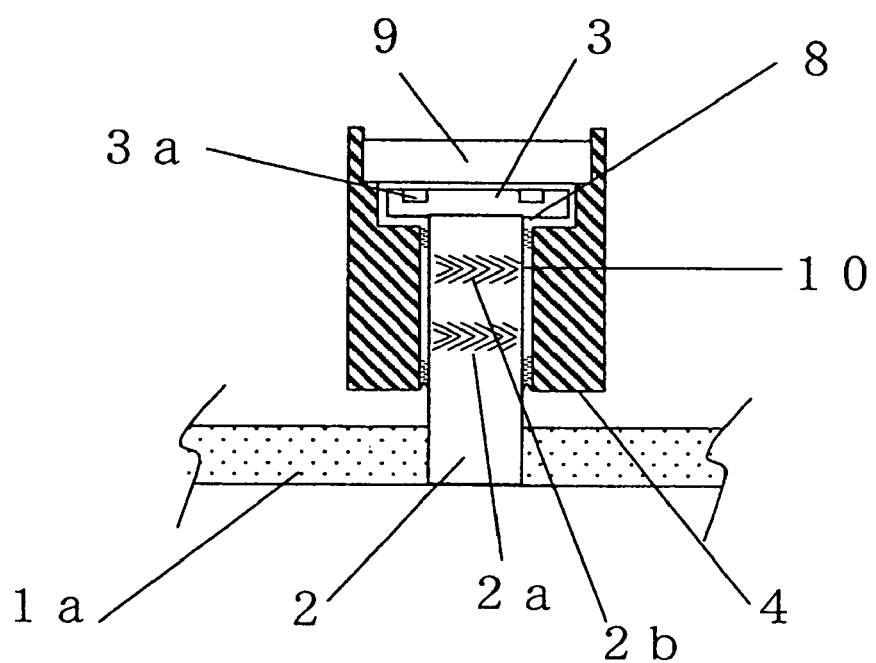
FIG. 2 is a cross section drawing of a hydrodynamic bearing device in a fixed shaft type of Embodiment 1 of the present invention.

Embodiment 1 of the present invention is described with reference to FIG. 2. FIG. 2 is a cross section drawing of the main component for a hydrodynamic bearing device in a fixed shaft type of Embodiment 1.

In FIG. 2, radial dynamic pressure-generating grooves $2a$ and $2b$ are formed in a herringbone pattern on the outer circumferential surface of shaft 2. One end of the shaft 2 is affixed to thrust flange 3, and the other end is press fitted into base $1a$. Shaft 2 and thrust flange 3 form the shaft component. In the present invention, only the shaft 2 may constitute a shaft structure, and optionally, a part (FIG. 3) or all of the thrust flange 3 (FIG. 1 and FIG. 2) and the hub 15 may constitute the shaft structure. The shaft component and the base $1a$ constitute the fixed component.

On the one hand, sleeve 4 possesses a bearing bore that supports the shaft component. Thrust plate 9 is mounted on one end of sleeve 4. The shaft component is inserted into the bearing bore of sleeve 4 in such a manner as to face thrust plate 9 and thrust flange 3. Sleeve 4 and thrust plate 9 constitute the rotator. Thrust dynamic pressure-generating groove $3a$ is formed in a spiral pattern on the surface of thrust flange 3 opposite to thrust plate 9. The lubricant 8 described later is filled into the gap between the bearing bore and the shaft component. The rotator and the fixed component constitute the motor drive component.

With the rotation of rotator, dynamic pressure-generating grooves $2a$ and $2b$ gather up lubricant 8, and pumping pressure is generated in the radial direction at the radial gap 10 between shaft 2 and sleeve 4. Also, with the rotation, dynamic pressure-generating grooves $3a$ gathers up lubricant 8, and pumping pressure is generated in the thrust direction between thrust flange 3 and thrust plate 9. As a result, the rotator is buoyed upwards with respect to the fixed portion and is rotatably supported without contact.

Furthermore, rotational speeds of 4,200, 5,400, 7,200, 10,000, or 15,000 rpm are generally used for the motor.

In the hydrodynamic bearing device of the present invention, radial gap 10 between shaft 2 and sleeve 4 is about 1 to about 5 μm, preferably about 1.5 to about 4 μm, and further preferably about 1.5 to about 3 μm.

Since the torque generally is inversely proportional to the gap, and the stiffness is inversely proportional to the third power of the gap, it is essential that the gap correspond to the viscosity of the lubricant. Consequently, within a range of gaps, when a lubricant is used with a hydrodynamic bearing device of the present invention, if the effect of a lowered viscosity of the lubricant can be adequately realized, then it is possible to obtain both a lowered torque along with the required stiffness in the bearing.

Generally, if there is a low viscosity lubricant in a hydrodynamic bearing device, it is necessary to make the radial gap smaller in order to ensure a given shaft stiffness in a high temperature environment. However, within the above-described range of gaps, the lubricant used in the hydrodynamic bearing device of the present invention will have a minimal effect on the gap, while having a maximal effect on the reduction in torque. Moreover, if the bearing lock produced by contamination with foreign matter or wear particles generated at starting and stopping times can be prevented, it will be possible to increase the reliability of the device. Furthermore, excessively high accuracy in machining and assembling the shaft, sleeve and the like would be unnecessary, which can prevent cost increases. In addition, while realizing a maximal effect from decreasing the viscosity of the lubricant used in the hydrodynamic bearing device of the present invention, the stiffness of the bearing will be maintained, so that sufficient durability can be obtained under conditions of practical use. In addition, increased eccentricity of the shaft is prevented, and fluctuations in the plane of revolution are controlled in a recording medium such as a magnetic disk that is mounted on the spindle motor, so that any consequent reductions in positional accuracy in recording and playback or variations in signal strength will be minimized, and it is possible for magnetic disk device performance criteria to be adequately satisfied. Furthermore, since the contact area between the lubricant and the air is minimized, oxidative degradation of the lubricant is minimized, and the operational lifetime of the bearing device can be maintained.

Moreover, a diameter of about 1 to about 4 mm for shaft 2 is preferred. As a result, since the stiffness of the shaft is maintained, the gap and the length of the shaft can be appropriately adjusted, and the limitations on miniaturizing the device will be suppressed, so that the required performance criteria can adequately be satisfied. In addition, the balance between the stiffness and the torque loss is regulated, so that the effect of the lubricant can be adequately realized. Since it is paired with radial gap 10, shaft 2 preferably has a diameter of about 1.5 to about 3.5 mm, and further preferably a diameter of about 1.5 to about 3 mm. In this way, the lubricant in the hydrodynamic bearing device of the present invention can utilized to the maximum extent.

For the material of shaft 2, stainless steel is the most suitable. In comparison with other metals, stainless steel has high hardness, and the formation of wear particles can be effectively suppressed when the lubricant used in the hydrodynamic bearing device of the present invention has low viscosity and forms a thin adsorption layer to protect the surface of the shaft. More preferable is martensite stainless steel.

For sleeve 4, the use of a material such as copper alloy, iron alloy, stainless steel, ceramic, or resin is preferred. In addition, a material such as copper alloy, iron alloy or stainless steel that is more wear resistant and has higher workability, as well having a lower cost, is further preferred. Moreover, sintered materials are also satisfactory from the cost perspective, and the same effect can be obtained when the lubricant is impregnated into a sintered material. All or part of the surface of the shaft material and/or the sleeve material can be subjected to a surface modification treatment such as plating, physical vapor deposition, chemical vapor deposition, or diffusion coating.

Furthermore, as mentioned in the explanation above, radial dynamic pressure-generating grooves are formed on the outer circumferential surface of shaft 2, but they can also be formed on the bearing bore surface of sleeve 4 (inner circumferential surface), as well as on both the outer circumferential surface of shaft 2 and the bearing bore surface of sleeve 4. In other words, at least one of the shaft and the sleeve can possess radial dynamic pressure-generating mechanical features. Also, between the side face of thrust flange 3 and the sleeve 4 can possess radial dynamic pressure-generating mechanical features. Examples of dynamic pressure-generating mechanical features that can be mentioned include various types of shapes such as grooves, projections, bumps, and inclined planes. Moreover, for the radial dynamic pressure-generating grooves, various configurations such as a herringbone pattern and a spiral pattern can be employed.

In addition, thrust dynamic pressure-generating grooves can be formed either only on the face of thrust flange 3 opposite to thrust plate 9, or only on the face of thrust plate 9 opposite to thrust flange 3, or only the reverse side of the face of thrust flange 3 opposite to thrust plate 9, as well as on two or more of these three locations.

Furthermore, for any dynamic pressure-generating mechanical features similar to those mentioned above in addition to thrust dynamic pressure-generating grooves, any type of mechanical feature will be satisfactory.

One end of the shaft component is fixed in the Embodiments, although the present invention is not limited to this configuration, and the same effect can be obtained with both ends being fixed or with both ends of the bearing bore of the sleeve being open.

Embodiment 2

Figure 1:
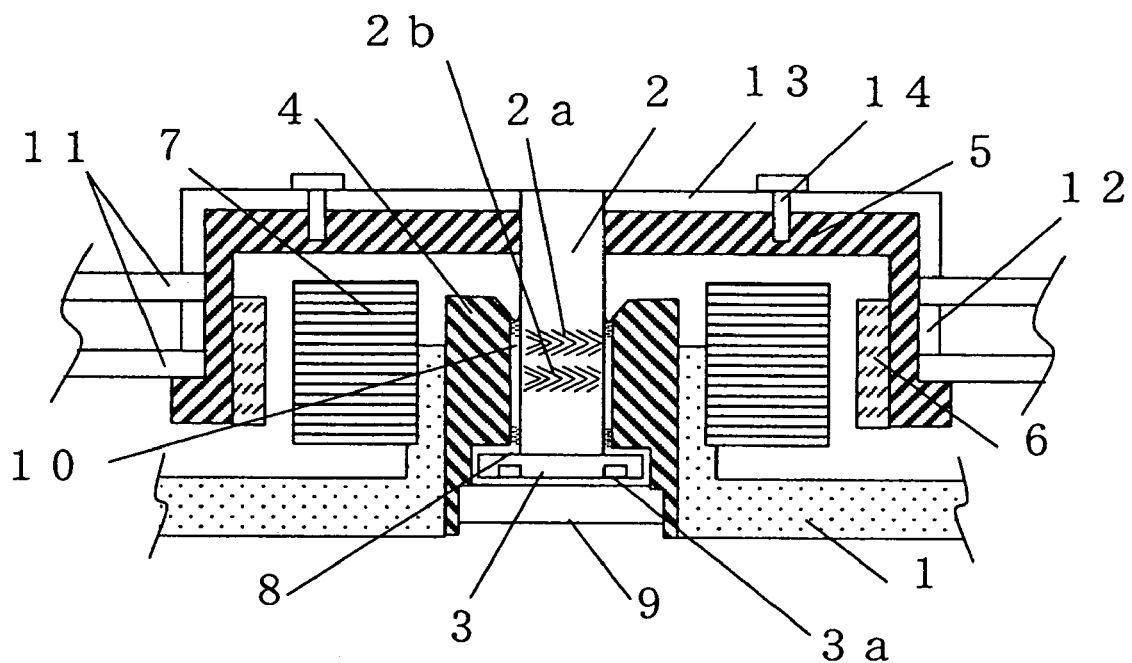
FIG. 1 is a cross section drawing of a magnetic disk device and a spindle motor that has the rotating shaft-type hydrodynamic bearing device in Embodiment 2 of the present invention.

Embodiment 2 of the present invention is explained by using FIG. 1. FIG. 1 is a cross section drawing of the main component of a magnetic disk device equipped with a spindle motor that possesses a rotating shaft-type hydrodynamic bearing device of Embodiment 2. The hydrodynamic bearing device in this Embodiment differs from the hydrodynamic bearing device in Embodiment 1 in FIG. 2 in the point that the present Embodiment has a rotating shaft type while Embodiment 1 has a fixed shaft type, and has the thrust dynamic pressure-generating grooves such as a herringbone pattern. With the exception of this point, Embodiment 2 is identical to Embodiment 1, and any of the elements having identical symbols have been omitted from the explanation.

In FIG. 1, radial dynamic pressure-generating grooves 2a and 2b are formed in a herringbone pattern on the outer circumferential surface of shaft 2, and one end of the shaft 2 is affixed to thrust flange 3, and the other end is press fitted into hub 5. Shaft 2 and thrust flange 3 form the shaft component. In hub 5, two magnetic disks made of glass 11 are layered about inserted spacer 12, and are fixed by clamp 13 with inserted retaining screws 14. Moreover, rotor magnet 6 is affixed to the inner circumferential surface of hub 5. The shaft component (shaft 2 and thrust flange 3), hub 5, rotor magnet 6, magnetic disks 11, spacer 12, clamp 13, and retaining screws 14 constitute the rotator.

On the other hand, sleeve 4 that is pressure fitted into base 1 possesses a bearing bore that bears the shaft component. Thrust plate 9 is mounted on one end of sleeve 4. The shaft component is inserted into the bearing bore of sleeve 4 in such a manner as to face thrust plate 9 and thrust flange 3. Stator coil 7 is mounted on a wall formed by base 1. Base 1, sleeve 4, thrust plate 9, and stator coil 7 form the fixed component. Thrust dynamic pressure-generating groove 3a is formed in a herringbone pattern on the surface of thrust flange 3 opposite to thrust plate 9. The bearing device is constituted when lubricant 8 described below is filled into the gap between the bearing bore and the shaft component. The rotator and the fixed component constitute the motor drive component.

The rotational driving action of the rotator due to this motor drive component will be explained.

First, stator coil 7 is energized to produce a rotating magnetic field, and rotor magnet 6 that is mounted to face stator coil 7 will experience rotational force, so that hub 5, shaft 2, magnetic disk 11, clamp 13 and spacer 12 all begin to rotate together. Due to this rotation, herringbone-shaped dynamic pressure-generating grooves 2a, 2b and 3a gather up lubricant 8, and pumping pressure is generated in the radial direction together with in the thrust direction (between shaft 2 and sleeve 4, and between thrust flange 3 and thrust plate 9). As a result, the rotator is buoyed upwards with respect to the fixed portion and is rotatably supported without contact, so that recording and playback of data on magnetic disk 11 is possible.

Furthermore, without being limiting in any way, the material of magnetic disk mounted on hub 5 can be glass or aluminum, and in the case of small-scale machine types one or more plates (usually one to two plates) are attached.

Embodiment 3

Figure 3:
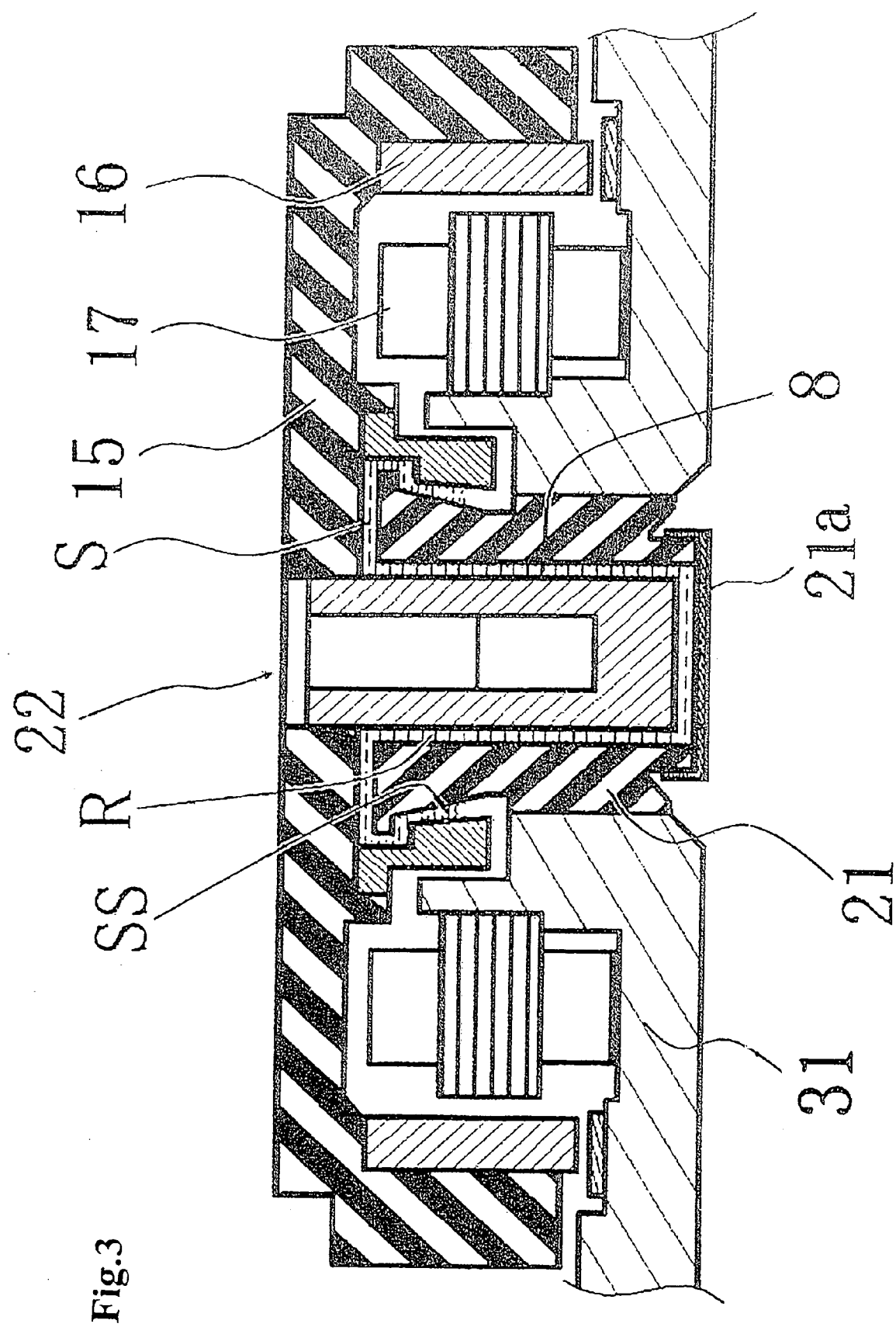
FIG. 3 is a cross section drawing of a hydrodynamic bearing device of Embodiment 3 of the present invention.

FIG. 3 is a cross section drawing of the main component of a magnetic disk device equipped with a spindle motor that possesses a rotating shaft-type hydrodynamic bearing device.

In this magnetic disk device, a sleeve 21 that is pressure fitted into the center of base 31 possessed a bearing bore that bears the shaft 22. Stator coil 17 is mounted on a wall formed by the base 31. The shaft 22 is inserted into the bearing bore of sleeve 21 from one end and the other end of the bearing bore is closed over by a cap 21a. Radial dynamic pressure-generating grooves (not shown) are formed in a herringbone pattern on the outer circumferential surface of shaft 22, and the one end of shaft 22 is press fitted into hub 15 as well as the other end of shaft 22 is opposed to the cap 21a. The outer circumferential surface of the shaft 22 (a dynamic-pressure surface) is radially opposed to the inner circumferential surface of the sleeve 21 (a dynamic-pressure surface) such that a gap R is interposed therebetween and the gap R is filled with a lubricant 8. A rotor magnet 16 is affixed to the inner circumferential surface of hub 15. Shaft 22 and hub 15 form a shaft structure.

The upper end face of the sleeve 21 (a dynamic-pressure surface) and the undersurface of the hub 15 (a dynamic-pressure surface) are disposed so as to axially oppose each other and to interpose a gap S therebetween. Thrust dynamic-pressure-generating grooves in a spiral pattern are formed in at least one of either of dynamic-pressure surfaces of the sleeve 21 or hub 15 (not shown in FIG. 3). This gap S is filled with the lubricant 8, from the gap R to the gap S, this lubricant 8 is charged with in an essentially continuous manner and without interruption.

When the shaft 22 and the hub 15 rotate, dynamic pressure generates within the lubricant 8 by the action of the thrust dynamic pressure generating grooves described above. Due to the dynamic pressure, shaft 22 and hub 15 are buoyed upwards with respect to the thrust direction and is rotatably supported without contact.

The seal section SS having a gap is provided on the outer circumferential surface of the sleeve 21. The gap in which the seal section SS is formed connects with the gap S at the diametrically outer side of sleeve 21 and is configured to expand heading downward. Thus, the seal section SS prevents external outflow of the lubricant 8.

For the hydrodynamic bearing device of the present invention, for example in Examples 1 through 3, it is possible to maintain a reliable and stable electrical conductive path between shaft 2 and sleeve 4 by introducing a highly-conductive lubricant to be described below. For this reason, the accumulated electric charge can be grounded through the rotation of the rotating component so that the electric charge will not be discharged between the magnetic disk and the record/replay head, and furthermore so that no record/replay failures or damage to the record/replay head will occur.

For lubricant 8 to be used in the present invention, a diester with a total carbon number of 20 to 28 obtained from a divalent alcohol that has at least one ether bond and one or more types of C6 to C10 saturated monovalent fatty acid can be used. Since this diester has one or more ether bonds and 2 ester bonds, it will exhibit strong molecular polarity. For this reason, it readily attracts electrical charge, and the accumulated electrical charge can easily be transferred. This has the result that the volume resistivity of the lubricant can be reduced.

There are no particular limitations on the divalent alcohol employed as long as it contains one or more ether bonds. For example, a divalent alcohol that contains 1 to 4 ether bonds is suitable. Specific examples that can be named that have one ether bond include diethylene glycol, dipropylene glycol, dibutylene glycol, and the like. Specific examples that can be named that have two ether bonds include triethylene glycol, tripropylene glycol, tributylene glycol, and the like. Specific examples that can be named that have three ether bonds include tetraethylene glycol, tetrapropylene glycol, tetrabutylene glycol, and the like. Specific examples that can be named that have four ether bonds include pentaethylene glycol, pentapropylene glycol, and the like.

In addition, combined glycols obtained via a condensation of two or more glycols selected from among ethylene glycol, propylene glycol, butylene glycol, and the like are also suitable for use. For example, it includes a combined glycol obtained via a condensation of ethylene glycol and propylene glycol (ethylene/propylene glycol), a combined glycol obtained via a condensation of butylene glycol and ethylene glycol (butylenes/ethylene glycol), a combined glycol obtained via a condensation of butylene glycol and propylene glycol (butylenes/propylene glycol), combined glycols obtained via a condensation of ethylene glycol, propylene glycol and butylene glycol (butylene/ethylene/propylene glycol, butylene/propylene/ethylene glycol, ethylene/butylene/propylene glycol), and the like.

Such combined glycols may be combined glycols obtained via a condensation of any one glycol molecules to one molecule of any other glycol(s), and may be combined glycols in which some or all thereof are obtained via a condensation of any combination of two or more molecules of any glycol(s). For example, it includes a combined glycol obtained via a condensation of two molecules ethylene glycol and one molecule of propylene glycol (diethylene/propylene glycol, ethylene/propylene/ethylene glycol), a combined glycol obtained via a condensation of one molecule of ethylene glycol and two molecules of propylene glycol and one molecule of butylene glycol (ethylene/dipropylene/butylene glycol, ethylene/propylene/butylene/propylene glycol, etc.,), and the like In the cases where regioisomers of such alcohols exist, any of these regioisomers or mixtures thereof can be employed.

Such combined glycols can be prepared by any conventional method in the art. The method includes a condensation reaction (polycondensation, polyaddition, etc., including a dehydration condensation) among glycols, a reaction between glycol and alkylene oxide, under the presence or absence of a catalyst.

Among these, preferred examples that have particularly superior capabilities such as heat resistance, or viscosity characteristics, or low-temperature fluidity are diethylene glycol, dipropylene glycol, triethylene glycol, tripropylene glycol, a combined glycol obtained via a condensation of ethylene glycol and propylene glycol (ethylene/propylene glycol), and a combined glycol obtained via a condensation of two molecules ethylene glycol and one molecule of propylene glycol (diethylene/propylene glycol, ethylene/propylene/ethylene glycol), and dipropylene glycol, tripropylene glycol, and a combined glycol obtained via a condensation of two molecules ethylene glycol and one molecule of propylene glycol (diethylene/propylene glycol, ethylene/propylene/ethylene glycol) are preferred in particular.

A mixture of one or two or more types of divalent alcohol can be used.

The acid component of the diester is a C6 to C10 saturated monovalent fatty acid. Since such acids do not contain unsaturated bonds, they will have high stability with respect to heat and oxidation (high heat resistance). Moreover, even in a high-temperature environment under high-speed rotation conditions, degradation is unlikely to take place, and essentially the viscosity and amount of evaporation can be controlled, and the low temperature fluidity can be increased. Consequently, a device can be designed to have a long operational lifetime.

Using only one type of such saturated monovalent fatty acids is satisfactory, but the mixed use of two or more types is preferred. It is possible to increase the low-temperature fluidity, evaporation characteristics and the like further with two or more types of the fatty acids than by using a single type. For this reason, the temperature range for the possible use of the device can be expanded, and it is possible to extend further the operational lifetime. Examples of mixtures for when two or more types are used include fatty acids with straight chains and branched chains that have the identical carbon number, those with branched chains that have the identical carbon number and have different branching points, those with straight chains that have different carbon numbers, those with straight chains and branched chains that have the different carbon numbers, those with branched chains that have different carbon numbers, and the like. Among these, the use of a minimum of one or more straight chain fatty acids is preferred. As a result, the heat resistance of the lubricant can be further increased, and the amount of evaporation can be reduced. Moreover, changes of temperature in viscosity can be suppressed. Consequently, it is possible to extend the operational lifetime of the device, and to suppress changes of temperature in the torque. In addition, by using saturated monovalent fatty acids with the identical carbon number, and in particular fatty acids with straight chains and branched chains that have the identical carbon number, the device will have enhanced performance stability, and high reliability will be achieved because there will be no significant differences between the fatty acids with respect to properties such as the heat resistance, density, and the like.

Specific examples of such fatty acids than can be mentioned include n-hexanoic acid, n-heptanoic acid, n-octanoic acid, n-nonanoic acid, n-decanoic acid, isohexanoic acid, isoheptanoic acid, isooctanoic acid, 2-ethylhexanoic acid, isononanoic acid, 3,5,5-trimethylhexanoic acid, isodecanoic acid, and the like.

In particular, C7 to C9 straight-chain saturated monovalent fatty acids have superior capabilities such as heat resistance and viscosity characteristics. In this way, it is possible to achieve a hydrodynamic bearing device with high reliability that has low torque, in other words that has low power consumption. Examples that can be mentioned include n-heptanoic acid, n-octanoic acid, n-nonanoic acid and the like.

Since C7 to C9 branched-chain saturated monovalent fatty acids have superior heat resistance and low-temperature fluidity, and they are effective at increasing the reliability of the bearing and at maintaining the capability of starting up rotation in the low temperature region. Examples that can be mentioned include isoheptanoic acid, isooctanoic acid, 2-ethylhexanoic acid, isononanoic acid, 3,5,5-trimethylhexanoic acid and the like.

For the diesters in the lubricants used in the present invention, a total carbon number of 20 through 28 is preferred, 22 through 26 is more preferred, and 23 through 25 is furthermore preferred. For this reason, devices of the present invention can be designed to have bearings with reduced torque, lower amounts of evaporation, and longer operational lifetimes, which are advantageous for lower cost and miniaturization.

In addition, they can maintain the capability of starting up rotation in the low temperature region.

These diesters can be synthesized by carrying out known esterification reactions on given alcohol components and acid components either in the presence or absence of catalysts.

Furthermore, it is also acceptable to employ two or more types of lubricant in mixture.

For example, a diester obtained from 1 type of alcohol component and two types of acid component will be a diester mixture having a total of three diester species, among which there are two types of diester that have simple structures with bonds to a single type of acid component residue in the molecule, and one type of diester that has a mixed structure with bonds to two types of acid component residue in the molecule. It is acceptable to use such a diester mixture as is.

Since the diester lubricants of the present invention have a volume resistivity that is lower than that of known esters, and it will be possible to suppress the electrostatic charge in a device in a satisfactory manner while the specific addition of conductivity-enhancing additives will be unnecessary.

The lubricants 8 of the present invention can furthermore be mixed with other types of added oils. These added oils can be suitably selected in order to reduce or adjust the viscosity, and furthermore in order to increase the heat resistance, or with the aim of adding or supplementing other performance characteristics.

Specifically, examples that can be named of compounds that are already known include mineral oils, poly-α-olefins, alkylaromatics, polyglycols, phenyl ethers, polyol esters, diesters of dibasic acids, phosphate esters, and the like. For these added oils, one or two or more types can be added to the mixture. Among these, since polyol esters and diesters of dibasic acids have high heat resistance and excellent fluidity at low temperatures, they are effective at increasing the reliability of the bearing device and maintaining the capability of starting up rotation in low temperature ranges.

Examples of polyol esters that can be named include the esters of fatty acids with neopentyl glycols, 3-methyl-1,5-pentanediol, trimethylolpropanes, and pentaerythritols, while examples of diesters of dibasic acids that can be named include dioctyl sebacate (DOS), dioctyl azelate (DOZ), and dioctyl adipate (DOA), diisononyl adipate, diisodecyl adipate and the like.

The lubricant 8 can be a composition to which additives have been added. The additives can be known compounds selected with the aim of increasing or supplementing other performance characteristics of the base oil. Specifically, one or two or more additives such as antioxidants, rust inhibitors, metal deactivators, oiliness improvers, extreme pressure agents, friction modifiers, anti-wear agents, viscosity index improvers, pour-point depressants, antifoaming agents, anti-static additives, conductivity-enhancing additives, detergent dispersants, hydrolysis inhibitors and the like can be added to the combination. Additives can cause gas generation or a change in mass associated with degradation, so in order not to diminish the performance of the bearing, the total amount added should be kept to the minimum necessary. The total amount added of the additives is preferable of 0.1 to 5 wt % and more preferable of 0.5 to 4 wt % with respect to total weight of lubricant including a base oil and the additives.

In particular, antioxidants may be essential in order to increase the long-term reliability of the hydrodynamic bearing device. Specifically, antioxidants of the phenol type that do not contain sulfur or chlorine in the molecule or of the amine type as well are the most suitable for use with hydrodynamic bearing devices. If additives that contain sulfur or chlorine in the molecule undergo decomposition, corrosive gases will be generated, and there is a concern that these would exert a significant effect on the performance of the device. These types of antioxidants can be used singly or in combination. Among these, for antioxidants that can realize and maintain adequate effectiveness even when used in a device in a high temperature environment of about 80 to about 100° C. or higher, and that have high heat resistance, phenol-type antioxidants that possess two or more phenol units are preferable. When these are used in combination with added amine-type antioxidants, a synergistic effect can be obtained, which is preferable. Moreover, it is preferable to select and to use antioxidants of liquid type which is easy to start up rotation for device without lowing flowability in low temperature ranges.

Furthermore, for a lubricant of the present invention that is low in viscosity and that forms a thin adsorption protective layer on the surfaces, a decreased amount of friction and wear will be produced through contact between the shaft and sleeve when the hydrodynamic bearing device starts and stops, when compared to a conventional device. For this reason, the aforementioned antioxidants readily forms a layer on the metal surfaces of the shaft and the sleeve when it is added, and it is most preferable to add at least one additive that does not contain sulfur or chlorine in the molecule selected from among rust inhibitors, metal deactivators, oiliness improvers, extreme pressure agents, friction modifiers, and anti-wear agents.

Specific examples of additives that can be mentioned include azoles such as benzotriazole, fatty acids and their derivatives such as oleic acid, n-tetradecanoic acid, n-hexadecanoic acid and n-octadecanoic acid, aliphatic alcohols such as oleyl alcohol, esters such as succinate esters, succinate half-esters, phosphate esters and phosphite esters, and others such as metal salts, phosphate ester salts, aliphatic amines, alkyl imidazoles, glycerol monooleates, sorbitan monooleates and the like.

Due to the heat generated from friction and wear that is associated with the contact between the shaft and sleeve when the hydrodynamic bearing device starts and stops, the general purpose metal salts that are known for use as various of the additives will react with the carboxylic acids produced from decomposition of the lubricant esters, so that it is preferable not to use such metal salts because precipitates can form from the resulting carboxylate salts.

With the bearing configuration being held constant, since the power consumption of the motor will be greater with a lubricant of higher viscosity, and moreover since the power consumption will be greater with higher motor rpm, it is better for the viscosity of the lubricant to be lower. However, when the viscosity of the lubricant is low, it will be necessary to reduce the radial gap in order to maintain the stiffness of the shaft. If the radial gap is made too small, there is a greater likelihood that adventitious foreign matter will cause the rotation of the bearing to lock, which reduces the reliability of the device. Accordingly, the viscosity of the lubricant at 20° C. is preferably about 5 to about 35 mPa·s, more preferably about 5 to about 30 mP·s, and about 10 to about 25 mPa·s is particularly preferable. At the usual upper temperature limit of 80° C. for bearing use, the viscosity is preferably about 2 to about 5 mPa·s, and about 2 to about 4 mPa·s is particularly preferable.

When the volume resistivity at 20° C. of the lubricant is $1 \times 10^{11} \Omega \cdot cm$ or less, it will exhibit favorable conductivity and the device reliability can be maintained. The volume resistivity at 20° C. of the known ester-type lubricants is approximately $1 \times 10^{11}$ to $1 \times 10^{13} \Omega \cdot cm$. The volume resistivity at 20° C. of the lubricant in a hydrodynamic bearing device of the present invention is preferably $1 \times 10^{11} \Omega \cdot cm$ or less, and is more preferably $1 \times 10^{10} \Omega \cdot cm$ or less. Furthermore, the method used to measure the volume resistivity was based upon the JIS-C2101.

According to the JIS-C2101 standard, the amount of evaporation of a lubricant is satisfactory if it is $\leqq 4$ wt % when heated to 150° C. for a 24-hour period.

Low-temperature solidification should take place preferably at a temperature of $\leqq -20°$ C., more preferably at $\leqq -40°$ C. As a result, even in a low-temperature environment of about $-20°$ C. that is the lower limit of the operating temperature of a conventional bearing, it is possible to start up rotation without placing an undue load on the hydrodynamic bearing device or the spindle motor. However, the low-temperature solidification temperature is different from the pour point for the lubricant that is generally measured according to the JIS-K2269. The low-temperature solidification point is the temperature at which all or part of the lubricant sample in a cup solidifies after being allowed to stand in a thermal bath for two days, which is a temperature that is several to several tens of degrees higher than the pour point temperature.

In particular, with a volume resistivity of $1 \times 10^{11} \Omega \cdot cm$ or less when the viscosity is 2 to 5 mPa·s at 80° C. and the low-temperature solidification point is $-20°$ C. or lower, an effective balance can be obtained between the viscosity characteristics, low-temperature solidification point, conductivity, heat resistivity and the like. For this reason, it is possible to realize a hydrodynamic bearing device that has low torque, in other words that has low power consumption, high reliability and a long operational lifetime.

When filling the hydrodynamic bearing device with lubricant 8, it is recommended for the lubricant to be filtered beforehand through a filter with a pore diameter less than the dimensions of the smallest radial gap, for example, either pressurized or reduced pressure filtration, in order to remove foreign matter. As a result, the rotation of the bearing to lock can be prevented.

The spindle motors and magnetic disk devices of the present invention are explained in more detail below. Furthermore, the amounts (wt %) of additives added to the compositions of the present invention are given in proportion to the total weight of the lubricant containing both the base oil and the additives.

Examples 1 through 9, Comparative Examples 1 and 2

The lubricants incorporate phenol-type antioxidants that contain two phenol units: 0.5 wt % of 4,4'-methylenebis-2,6-di-tert-butylphenol.

Reduced pressure filtration was performed on all of the lubricants, using a filter with a pore diameter$\leqq 2.5$ µm, in order to remove impurities.

Example 1

Mixture of three kinds of diester having total carbon number of 20 to 22 obtained by diethylene glycol and n-octanoic acid/3,5,5-trimethylhexanoic acid (molar ratio of 50:50) is used as the lubricant.

Example 2

Diester having total carbon number of 22 obtained by dipropylene glycol and n-octanoic acid is used as the lubricant.

Example 3

Diester having total carbon number of 24 obtained by dipropylene glycol and n-nonanoic acid is used as the lubricant.

Example 4

Diester having total carbon number of 22 obtained by triethylene glycol and 2-ethylhexanoic acid is used as the lubricant.

Example 5

Diester having total carbon number of 23 obtained by tripropylene glycol and n-heptanoic acid is used as the lubricant.

Example 6

Diester having total carbon number of 25 obtained by tripropylene glycol and n-octanoic acid is used as the lubricant.

Example 7

Diester having total carbon number of 23 obtained by ethylene/propylene glycol and n-nonanoic acid is used as the lubricant.

Example 8

Diester having total carbon number of 23 obtained by diethylene/propylene glycol and n-octanoic acid is used as the lubricant.

Example 9

Diester having total carbon number of 25 obtained by diethylene/propylene glycol and n-nonanoic acid is used as the lubricant.

Comparative Example 1

The diester dioctyl sebacate (DOS) is used as the lubricant.

Comparative Example 2

The polyol ester obtained by neopenthyl glycol and n-nonanoic acid is used as the lubricant.

The radial gap 10 between the shaft 2 and the sleeve 4 is 2.5 μm, the shaft 2 is martensite stainless steel with a diameter of 3 mm, the sleeve 4 is a nickel-plated copper alloy with a spindle motor that is equipped with a hydrodynamic bearing device, and the lubricants in Examples 1 through 9 and Comparative Examples 1 and 2 are filled in with the corresponding required identical amounts. The motor consumption current was measured at 5400 rpm in 0° C. and 20° C. environments. The motor energy consumption values are shown with the motor consumption current in Comparative Example 1 at 20° C. set to a value of 100.

In addition, after 500 hours of continuous rotation at 100° C., hub 5 and magnetic disk 11 were removed, and in the gap between the open end of sleeve 4 (the top side in FIG. 1) and shaft 2, the presence of the liquid level, that is the fluid fill level for the lubricant 8, was identified from the upper surface and evaluated using a microscope. When the lubricant 8 liquid level could not be identified, it was assumed that the quantity of lubricant 8 had diminished through evaporation, and since the liquid level had dropped to the interior of the bearing, the amount of lubricant was insufficient to the requirements for sustained performance, and the Example was judged as having inadequate reliability.

Furthermore, after the spindle motors were allowed to stand for 5 hours in a −20° C. and −40° C. environments, each of them was evaluated for whether it could start up rotation at −20° C. and −40° C.

These results are shown in Table 1.

TABLE 1

| | Total carbon number | Volume resistivity (Ω cm) | Motor consumption current 0° C. | Motor consumption current 20° C. | Start up rotation −20° C. | Start up rotation −40° C. | Liquid level present |
|---|---|---|---|---|---|---|---|
| Ex. 1 | 20–22 | 9.0 × 10$^9$ | 148 | 80 | + | + | + |
| Ex. 2 | 22 | 8.5 × 10$^9$ | 127 | 73 | + | + | + |
| Ex. 3 | 24 | 7.3 × 10$^9$ | 165 | 86 | + | + | + |
| Ex. 4 | 22 | 1.1 × 10$^{10}$ | 155 | 81 | + | + | + |
| Ex. 5 | 23 | 6.5 × 10$^9$ | 139 | 77 | + | + | + |
| Ex. 6 | 25 | 4.8 × 10$^9$ | 174 | 89 | + | + | + |
| Ex. 7 | 23 | 9.6 × 10$^9$ | 148 | 82 | + | + | + |
| Ex. 8 | 23 | 8.9 × 10$^9$ | 147 | 82 | + | + | + |
| Ex. 9 | 25 | 1.0 × 10$^{10}$ | 175 | 91 | + | ± | + |
| Cmp. Ex. 1 | — | 7.5 × 10$^{11}$ | 209 | 100 | + | + | + |
| Cmp. Ex. 2 | — | 9.0 × 10$^{11}$ | 161 | 85 | − | − | − |

It is clear from Table 1 that the motor consumption current has been reduced in all of Examples 1 through 9 relative to Comparative Example 1, and it is possible to start up rotation, except for Example 9, even in the extremely low temperature region of −40° C. On the other hand, the motor consumption current in Comparative Example 2 is lower than in any of the Examples 1 through 9, but it is entirely impossible to start up rotation at −20° C. and −40° C. Moreover, there was a significant amount of evaporation from observation of the liquid level.

Furthermore, relative to the volume resistivity of 7.5× 10$^{11}$Ω·cm or more for the lubricants in Comparative Examples 1 and 2, a favorable electrostatic charge prevention effect is observed in all of Examples 1 through 9 that have a volume resistivity of 1.1×10$^{10}$Ω·cm or less.

The pour points indicated by the low-temperature fluidity of the lubricants in Examples 1 through 9 and Comparative Examples 1 and 2 do not necessarily correspond to the possible temperatures for motor rotation start-up. The pour points here were measured for example by the JIS-K2269, where the time period for being kept in the test environment is not defined, which is an example of a factor that could lead to differences in the observed solidification point.

Example 10 to 25

With the exception of the base oil used that is shown in Table 2, these Examples produce devices that possess the same constitution as Example 1. When these are evaluated in the same manner, the effect obtained is identical to that from Working Examples 1 through 8.

TABLE 2

| Example | Total C number | Divalent alcohol | Fatty acid |
|---|---|---|---|
| 10 | 20 | diethylene glycol | n-octanoic acid |
| 11 | 22 | diethylene glycol | n-nonanoic acid |
| 12 | 22 | diethylene glycol | 3,5,5-trimethylhexanoic acid |
| 13 | 22 | dipropylene glycol | 2-ethylhexanoic acid |
| 14 | 24 | dipropylene glycol | isononanoic acid |
| 15 | 24 | dipropylene glycol | 3,5,5-trimethylhexanoic acid |
| 16 | 22 | triethylene glycol | n-octanoic acid |
| 17 | 24 | triethylene glycol | n-nonanoic acid |
| 18 | 24 | triethylene glycol | isononanoic acid |
| 19 | 24 | triethylene glycol | 3,5,5-trimethylhexanoic acid |
| 20 | 27 | tripropylene glycol | n-nonanoic acid |
| 21 | 27 | tripropylene glycol | 3,5,5-trimethylhexanoic acid |
| 22 | 25 | tripropylene glycol | 2-ethylhexanoic acid |
| 23 | 21 | combined glycol obtained via a condensation of ethylene glycol and propylene glycol | n-octanoic acid |
| 24 | 22 | combined glycol obtained via a condensation of ethylene glycol and butylene glycol | n-octanoic acid |
| 25 | 25 | combined glycol obtained via a condensation of two molecules of ethylene glycol and one molecule of propylene glycol | 3,5,5-trimethylhexanoic acid |

From all of the above, a hydrodynamic bearing device or a spindle motor of the present invention will allow the suppression of electrostatic charge in the device, together with having low power consumption, high reliability, suitability for miniaturization, and a long operational lifetime. It is possible to start up rotation even at the low temperature of −40° C.

INDUSTRIAL APPLICABILITY

Hydrodynamic bearing devices and spindle motors using same that relate to the present invention can find application as motors for magnetic disk devices (hard disk devices), scanner devices, laser beam printers, video recorders and optical disk devices. In particular, magnetic disk devices and spindle motors equipped with small-scale magnetic disks 2.5 or less inches in size are effective for the present invention. Furthermore, the present invention can, for example, also be applied to hydrodynamic bearing devices used in mobile devices.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A hydrodynamic bearing device comprising:
   a shaft structure with a diameter of 1-4 mm and having a shaft first end;
   a sleeve including a sleeve first end, and the sleeve being positioned so that a radial gap of 1-5 μm is formed between the sleeve and shaft structure;
   a hub connected to the shaft first end, such that the gap extends between the hub and the sleeve first end; and
   a lubricant disposed in the gap between the shaft structure and the sleeve, wherein the lubricant contains a diester with a total carbon number of 20-28, the diester being selected from the group consisting of,
   (1) a diester obtained from dipropylene glycol and n-nonanoic acid, and
   (2) a diester obtained from
      (a) a combined glycol obtained via condensation of a least one molecule of ethylene glycol and at least one molecule of propylene glycol, and
      (b) a saturated monovalent fatty acid selected from the group consisting of n-heptanoic acid, n-octanoic acid and n-nonanoic acid,
   and the diester having a viscosity of 2-5 mPa·sec at 80° C., a low-temperature solidification point of $\leqq-20°$ C. and a volume resistivity of $\leqq 1\times 10^{11} \Omega \cdot cm$ at 20° C.,
   wherein at least one of the shaft structure and the sleeve has a dynamic pressure-generating mechanism.

2. The hydrodynamic bearing device as recited in claim 1, wherein the diester is selected from the group consisting of diesters having a total carbon number of 20-28 and being obtained from,
   the combined glycol obtained via condensation of at least one molecule of ethylene glycol and at least one molecule of propylene glycol, and
   the saturated monovalent fatty acid selected from the group consisting of n-heptanoic acid, n-octanoic acid and n-nonanoic acid,
   and the diester has a viscosity of 2-5 mPa·sec at 80° C., a low-temperature solidification point of $\leqq-20°$ C. and a volume resistivity of $\leqq 1\times 10^{11} \Omega \cdot cm$ at 20° C.

3. The hydrodynamic bearing device as recited in claim 2, wherein the diester is
   the diester obtained from ethylene/propylene glycol and n-nonanoic acid, or
   the diester obtained from diethylene/propylene glycol and n-octanoic acid.

4. A spindle motor equipped with the device as recited in claim 2.

5. A spindle motor equipped with the device as recited in claim 3.

6. An information device equipped with the spindle motor as recited in claim 4.

7. An information device equipped with the spindle motor as recited in claim 5.

8. An information device which is a hard disk device according to claim 6.

9. An information device which is a hard disk device according to claim 7.

* * * * *